US010611926B2

(12) United States Patent
Schaapman

(10) Patent No.: US 10,611,926 B2
(45) Date of Patent: Apr. 7, 2020

(54) LIGHT ROSIN ESTER COMPOSITIONS AND METHODS OF MAKING SAME

(71) Applicant: KRATON POLYMERS LLC, Houston, TX (US)

(72) Inventor: Mark C. Schaapman, Almere (NL)

(73) Assignee: Kraton Polymers LLC, Houston, TX (US)

(*) Notice: Subject to any disclaimer, the term of this patent is extended or adjusted under 35 U.S.C. 154(b) by 40 days.

(21) Appl. No.: 16/024,794

(22) Filed: Jun. 30, 2018

(65) Prior Publication Data

US 2019/0002733 A1 Jan. 3, 2019

Related U.S. Application Data

(60) Provisional application No. 62/527,730, filed on Jun. 30, 2017.

(51) Int. Cl.
| | | |
|---|---|---|
| *C09F 1/04* | (2006.01) | |
| *C09J 193/04* | (2006.01) | |
| *C09F 1/02* | (2006.01) | |
| *C08L 93/04* | (2006.01) | |

(52) U.S. Cl.
CPC .............. *C09F 1/04* (2013.01); *C08L 93/04* (2013.01); *C09F 1/02* (2013.01); *C09J 193/04* (2013.01)

(58) Field of Classification Search
CPC ..................... C09F 1/04; C09J 193/04
See application file for complete search history.

(56) References Cited

U.S. PATENT DOCUMENTS

| | | | |
|---|---|---|---|
| 2,017,866 A | 10/1935 | Morton | |
| 2,108,928 A | 2/1938 | Rummelsburg | |
| 2,369,125 A | 2/1945 | Anderson | |
| 2,412,720 A | 12/1946 | Dolman | |
| 2,538,103 A | 1/1951 | Koonce et al. | |
| 2,625,540 A | 1/1953 | Crawford | |
| 3,423,389 A | 1/1969 | Wheelus | |
| 4,088,618 A | 5/1978 | Saltzman et al. | |
| 4,302,371 A | 11/1981 | Matsuo et al. | |
| 4,380,513 A | 4/1983 | Ruckel et al. | |
| 4,585,584 A | 4/1986 | Johnson, Jr. et al. | |
| 4,585,876 A | 4/1986 | Fischer et al. | |
| 4,657,703 A | 4/1987 | Durkee | |
| 4,661,595 A | 4/1987 | Avar | |
| 4,822,526 A | 4/1989 | Tsuchida et al. | |
| 5,504,152 A | 4/1996 | Schluenz et al. | |
| 5,545,760 A | 8/1996 | Walters et al. | |
| 5,830,992 A | 11/1998 | Whalen | |
| 2011/0034669 A1 | 2/2011 | Dallavia | |
| 2014/0107354 A1 | 4/2014 | Wang et al. | |

FOREIGN PATENT DOCUMENTS

| | | |
|---|---|---|
| CN | 1772829 | 5/2006 |
| CN | 1800005 | 7/2006 |
| CN | 101649171 | 8/2011 |
| CN | 101649165 | 12/2011 |
| CN | 102634054 | 7/2013 |
| CN | 103436177 | 12/2013 |
| CN | 103805050 | 5/2014 |
| CN | 104877440 | 9/2015 |
| CN | 102911600 | 10/2015 |
| CN | 105669892 | 6/2016 |
| CN | 105754485 | 7/2016 |
| CN | 105778765 | 7/2016 |
| CN | 105802500 | 7/2016 |
| CN | 105802501 | 7/2016 |
| CN | 106277912 | 1/2017 |
| CN | 104844808 | 3/2017 |
| EP | 0296625 | 12/1988 |
| EP | 0520574 | 8/2000 |
| JP | 62030170 | 2/1987 |
| JP | 02064182 | 3/1990 |
| JP | 09249811 | 9/1997 |
| WO | 95/29288 | 11/1995 |
| WO | 02/074715 | 9/2002 |
| WO | WO-2015048415 A2 * | 4/2015 |

OTHER PUBLICATIONS

F. Wilkinson, "Transfer of Triplet State Energy and the Chemistry of Exited States," 66 Journal of Physical Chemistry 2569 (1962).*

* cited by examiner

*Primary Examiner* — Nicholas E Hill
(74) *Attorney, Agent, or Firm* — Ramesh Krishnamurti

(57) ABSTRACT

A light color or a low color rosin or a rosin ester composition is disclosed. Significant color improvement can be obtained for a low color rosin, or a rosin ester by using a co-catalyst. In one embodiment, the co-catalyst has a triplet formation quantum yield ($\phi_T$) of greater than 0.5 and a triplet lifetime ($\tau_T$) of greater than 0.5 microseconds In another embodiment, the co-catalyst is selected from acridone, anthrone, 9-fluorenone, thioxanthone, xanthone, derivatives and combinations thereof.

31 Claims, No Drawings

LIGHT ROSIN ESTER COMPOSITIONS AND METHODS OF MAKING SAME

RELATED APPLICATIONS

This application claims priority from U.S. Provisional Application No. 62/527,730, with a filing date of Jun. 30, 2017, the entire disclosures of which are incorporated herein by reference for all purposes.

FIELD

The disclosure relates to light color (or low color) rosins and rosin esters.

BACKGROUND

CN105754485A discloses the deep processing of rosin and discloses a rosin glycerin ester production method, for rosin glycerin ester with high softening point and high purity. CN105778765A discloses a method for producing a pentaerythritol rosin ester with high softening point and purity. CN105802500A and CN105802501A disclose methods for producing rosin glycerin ester that is high in purity and light in color. JP02064182 discloses a rosin ester having light color and excellent thermal stability, wherein the esterification reaction is performed by the dehydrative condensation of the rosin and the alcohol in an inert gas stream. Holton, H. H., Prepr. Pap. Annu. Meet. Tech. Sect., C.P.P.A, 62nd, CPPA, Montreal, QC, Canada, 1976, p. A107 discloses the use of anthraquinone as a pulping catalyst in paper industry.

There remains an unmet need for improving the color properties of rosin esters for various applications.

SUMMARY

In one aspect, a method to produce a light color rosin or to produce a light color rosin ester is disclosed. The method comprises the steps of: contacting one or more rosins with a co-catalyst to produce a mixture; heating the mixture to a temperature to produce a light color rosin. In one aspect, the co-catalyst has a triplet formation quantum yield ($\phi_T$) of greater than 0.5 and a triplet lifetime ($\tau_T$) of greater than 0.5 microseconds.

In another aspect, the co-catalyst is selected from acridone, anthrone, 9-fluorenone, thioxanthone, xanthone or derivatives and combinations thereof.

In yet another aspect, the co-catalyst comprises compounds represented by Formula I:

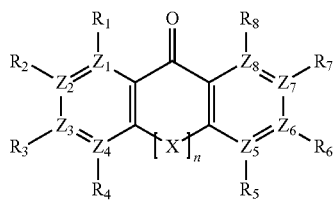

In another aspect, a method for producing a light color rosin ester is disclosed. The method comprising: contacting one or more rosins with a co-catalyst, a disproportionation catalyst, one or more polyhydric alcohols, optionally one or more of a monocarboxylic acid, and optionally one or more of a polycarboxylic acid to produce a mixture; heating the mixture to a temperature to produce a light color rosin ester; wherein the co-catalyst comprises compounds represented by formula I.

In yet another aspect, a method to provide a light color rosin ester is disclosed. The method comprises: contacting one or more rosins with a co-catalyst, a disproportionation catalyst, one or more polyhydric alcohols and, optionally one or more monocarboxylic acids, and optionally one or more polycarboxylic acids, to produce a mixture; wherein the co-catalyst has a triplet formation quantum yield ($\phi_T$) of greater than 0.5 and a triplet lifetime ($\tau_T$) of greater than 0.5 microseconds.

DETAILED DESCRIPTION

Unless otherwise indicated, the following definitions are applicable to this disclosure.

Acid value (or "neutralization number" or "acid number" or "acidity"): The mass of potassium hydroxide (KOH) in milligrams that is required to neutralize one gram of chemical substance. ASTM D465-05 (2010) can be used to determine acid number values.

Gardner color scale: A scale used to measure intensities of yellow color for liquid samples. Lighter (i.e., less) yellow intensity corresponds to a lower Gardner color value.

"Tall oil" also called "liquid rosin" is a viscous yellow-black liquid obtained as a co-product of the Kraft process of wood pulp manufacture when pulping mainly coniferous trees. Crude tall oil contains rosins (which contains resin acids (mainly abietic acid and its isomers), fatty acids (mainly oleic acid and linoleic acid) and tall oil pitch. By fractional distillation tall oil, distilled tall oil (with rosin content reduced to 10-35%) and tall oil fatty acid (TOFA) (with rosin content reduced to 0.1-10%) may be obtained.

"PAN number" refers to the sum of the weight percentages of palustric, abietic and neoabietic acid moieties as obtained by hydrolysis from the rosin ester.

Disclosed herein are light color, also referred to as low color, rosin esters and light color rosin ester compositions along with their methods of preparation. Further disclosed herein is a novel co-catalyst for obtaining light colored rosin and/or light color rosin ester compositions, and methods for preparing the rosin ester by contacting a rosin, the co-catalyst, and optionally a disproportionation agent and thermally treating. In an alternative aspect, a method of preparing the low color rosin ester comprises contacting (a) one or more rosins, in the presence of one or more novel co-catalysts and optionally an esterification catalyst and/or a disproportionation catalyst. In yet another aspect, a method of preparing a low color rosin ester comprises contacting (a) one or more rosins, (b) optionally one or more monocarboxylic acids, (c) one or more polyhydric alcohols and (d) optionally one or more polycarboxylic acids, in the presence of a disproportionation catalysts and one or more novel co-catalysts.

Component—Rosin: Rosin (or rosin acid) may include a mixture of rosin acids, with the precise composition of the rosin varying depending in part on the plant species. Rosin acids are $C_{20}$ fused-ring monocarboxylic acids with a nucleus of three fused six-carbon rings containing double bonds that vary in number and location. Examples include abietic acid, neoabietic acid, dehydroabietic acid, dihydroabietic acid, pimaric acid, levopimaric acid, sandaracopimaric acid, isopimaric acid, and palustric acid. Natural rosin typically consists of a mixture of several primarily abietic-type and pimaric-type acids in combination with minor amounts of other components.

Rosin may be commercially available, and may be obtained from pine trees by distillation of oleoresin (gum rosin being the residue of distillation), by extraction of pine stumps (wood rosin) or by fractionation of tall oil (tall oil rosin). Examples include tall oil rosin, gum rosin and wood rosin and mixtures thereof. If desired, rosin may be subjected to one or more purification steps (e.g., distillation under reduced pressure, extraction, and/or crystallization) prior its use as a rosin in the esterifying steps described herein. Hydrogenated rosins and partially hydrogenated rosins may also be used as a rosin source. In one embodiment, the rosin is tall oil rosin, e.g., SYLVAROS rosin products commercially from Kraton Chemical.

Crude tall oil (CTO), as obtained from the Kraft paper pulping process, includes substantial amounts of tall oil rosin and tall oil fatty acid (TOFA). Distilled tall oil (DTO) constitutes an industrial refinery output obtained from crude tall oil fractionated distillation, comprising tall oil rosin and TOFA (a mixture of several monocarboxylic acids), which can be used as a starting point for the preparation of rosin ester compositions. Examples include SYLVATAL™ product line by Kraton Chemical.

In some aspects, the rosin is subjected to one or more processing steps to improve the chemical and physical properties of the rosin ester. The methods can be performed prior to, concomitant with, or subsequent to preparation of the rosin ester. In one aspect, the rosin is partly dimerized or polymerized and then esterified to obtain rosin esters. Rosin polymerization and dimerization reactions are described in U.S. Pat. Nos. 2,369,125, 2,017,866, and 2,108,928, incorporated herein by reference. Such rosin polymerization and dimerization reactions can be catalyzed by Bronsted acids such as sulfuric acid or by Lewis acids such as $AlCl_3$.

In certain aspects, the rosin ester comprises a disproportionated rosin. Rosin disproportionation converts abietadienoic acid moieties into dehydroabietic acid and dihydroabietic acid moieties. Methods of disproportionation may involve heating rosin often in the presence of one or more disproportionation agents are described in, for example, U.S. Pat. Nos. 3,423,389, 4,302,371, and 4,657,703, all of which are incorporated herein by reference.

Examples of disproportionation agents include but are not limited to, thiobisnaphthols, including 2,2'thiobisphenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis(6-t-butyl-o-cresol) thiobisnaphthols, 2,2'-thio-bisphenols, 3,3'-thio-bis phenols; metals, including palladium, nickel, and platinum; iodine or iodides (e.g., iron iodide); sulfides (e.g., iron sulfide); and combinations thereof. In certain aspects, the rosin is disproportionated using a phenol sulfide type disproportionation agent such as poly-t-butyl-phenoldisulfide, 4,4'thiobis(2-t-butyl-5-methylpheno nonylphenol disulfide oligomers and amylphenol disulfide polymer.

In one embodiment, the rosin ester comprises a fortified rosin. In some aspects, the rosin is fortified prior to the esterification reaction to improve the chemical and physical properties of the resultant rosin ester. Fortification of rosin involves the chemical modification of the conjugated double bond system of rosin acids in the rosin, to provide a rosin having a lower PAN number and higher molecular weight than the rosin prior to fortification. For example, rosins may be fortified by means of a Diels-Alder or Ene addition reaction of a rosin acid with a dienophile, such as an $\alpha,\beta$-unsaturated organic acid or the anhydride of such an acid. Examples of suitable dienophiles include maleic acid, fumaric acid, acrylic acid, esters derived from these acids, and maleic anhydride. Rosins may also be phenolically modified by a reaction with phenol (or bisphenol A) and formaldehyde. Applied dienophiles or enophiles for fortification of the rosin include but are not limited to citraconic acid, mesaconic acid, maleic anhydride, maleic acid, fumaric acid and itaconic acid.

Rosin can include a mixture of rosin acids (e.g., abietadienoic acids) which may include conjugated double bonds within their ring systems. These conjugated double bonds may be a source of oxidative instability. In some embodiments, the rosin ester is processed to decrease the weight percent of components which include conjugated double bonds.

In some aspects, the rosin ester comprises a rosin having a PAN number of equal to or less than 25, alternatively equal to or less than 15, or alternatively equal to or less than 5. The rosin may comprise from equal to or greater than 30 wt. % dehydroabietic acid, alternatively 30-60 wt. %, or alternatively 40-55 wt. % based on the total weight of the rosin. In some aspects, the weight ratio of dehydroabietic acid to dihydroabietic acid in the rosin ranges from 1:0.80 to 1:0.25, alternatively 1:0.70 to 1:0.35, or alternatively from 1:0.55 to 1:0.40.

In further aspects, the rosin exhibits an acid number value from 120 to 190 mg KOH/gram, alternatively 150 mg KOH/gram to 185 mg KOH/gram, or alternatively from 170 mg KOH/gram to 182 mg KOH/gram. Acid number can be determined according to ASTM D465-05 (2010) and expressed as mg KOH per gram sample.

In some aspects, the rosin content of the rosin ester composition is in the range of from 20 wt. % to 100 wt. %, alternatively from 55-80 wt. %, or alternatively from 80 wt. % to 100 wt. % based on the total weight of the rosin ester.

Optional Component—Monocarboxylic acids: In an aspect, the rosin ester optionally comprise one or more monocarboxylic acids. Examples include aromatic monofunctional carboxylic acids, heteroaromatic monofunctional carboxylic acids, aliphatic monofunctional carboxylic acids, unsaturated linear or branched monofunctional carboxylic acids, partially unsaturated linear or branched monofunctional carboxylic acids, cycloaliphatic monofunctional carboxylic acids, partly unsaturated cyclic monofunctional carboxylic acids, natural fatty acids, synthetic fatty acids, fatty acids derived from vegetable oils or animal oils, and combinations thereof. In certain cases, the monocarboxylic acids may comprise oleic acid, linoleic acid, alpha-linolenic acid, palmitic acid, stearic acid, and combinations thereof. In certain aspects, the one or more monocarboxylic acids may comprise a tall oil fatty acid.

Monocarboxylic acids and their derivatives may be characterized by their iodine number. In certain aspects, the one or more monocarboxylic acids have an iodine number of less than 275 mg/g, alternatively less than 180 mg/g, alternatively less than 115 mg/g, alternatively less than 80 mg/g, alternatively from 55 mg/g to 270 mg/g, alternatively from 60 mg/g to 250 mg/g, or alternatively from 70 mg/g to 200 mg/g as determined according to the method described in ASTM D5768-02 (2014).

In some aspects, the rosin ester composition comprises 15-90 wt. %, alternatively from 30 wt. % to 80 wt. %, or alternatively from 40-75 wt. % of one or more monocarboxylic acids, based on the total weight of the components used to form the rosin ester.

Component—Polyhydric Alcohols: In embodiments, the rosin ester comprises one or more polyhydric alcohols. Polyhydric alcohols may include a combination of linear, branched, cyclic aliphatic, partially unsaturated, or aromatic chemical moieties, and may optionally include one or more additional functional groups in addition to the two or more hydroxyl moieties, such as an alkyl (e.g., $C_{1-3}$ alkyl), aryl (e.g., benzyl), alkoxy (e.g., methoxy), haloalkyl (e.g., trifluoromethyl), or keto group. In the case of aromatic polyhydric alcohols, the aromatic ring may optionally include one or more ring substituents, such as a fluoro, chloro, alkyl (e.g., methyl or ethyl), methoxy, or trifluoromethyl group. If desired, the one or more polyhydric alcohols may further include one or more heteroatoms (e.g., one or more oxygen, sulfur or nitrogen atoms) incorporated in the molecular structure, such as for example an ether group in the case of oxygen atom incorporation or a thioether group in the case of sulfur atom incorporation. In some cases, the one or more polyhydric alcohols comprise an aliphatic alcohol (e.g., a cycloaliphatic alcohol).

In some aspects, the one or more polyhydric alcohols may have an average hydroxyl functionality from 2 to 10, alternatively from 2 to 7, or alternatively from 3 to 5. In some cases, the one or more polyhydric alcohols comprise from 2 to 36, alternatively from 2 to 20 or alternatively from 2 to 8 carbon atoms. In some cases, the one or more polyhydric alcohols may have a boiling point greater than 240° C. at 1 atm.

Examples of polyhydric alcohols include, without limitation, ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyethylene glycol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, and lactitol. In certain cases, the one or more polyhydric alcohols may be selected from the group consisting of diethylene glycol, triethylene glycol, glycerol, trimethylolpropane, pentaerythritol, pentaerythritol technical grade, dipentaerythritol, polyglycerol, polyglycerol-4, tricyclo [5.2.1.0(2.6)]decane-4,8-dimethanol, cyclohexane-1,4-dimethanol, hydrogenated bisphenol A (4,4'-Isopropylidenedicyclohexanol) and combinations thereof.

In some aspects, the rosin ester may comprise from 5 wt. % to 40 wt. %, alternatively from 5 wt. % to 30 wt. %, alternatively from 8 wt. % to 18 wt. %, or alternatively from 8.5 wt. % to 13 wt. % by weight polyhydric alcohols, based on the total weight of the components used to form the composition.

Optional Component—Polycarboxylic Acids: In embodiments, the rosin ester composition comprises one or more polycarboxylic acids. Examples include dicarboxylic acid comprising from 2 to 35 carbon atoms, tricarboxylic acid, and tetracarboxylic acid. In some cases, the one or more polycarboxylic acids comprise from 2 to 54 carbon atoms.

Polycarboxylic acids may include a combination of linear, branched, cyclic aliphatic (cycloaliphatic), unsaturated, partially unsaturated, heteroaromatic or aromatic chemical moieties, and may optionally include one or more additional functional groups in addition to the two or more carboxylic acid moieties, such as a hydroxyl, alkyl (e.g., $C_{1-3}$ alkyl), aryl (e.g., benzyl), alkoxy (e.g., methoxy), haloalkyl (e.g., trifluoromethyl), or keto group. In the case of aromatic polycarboxylic acids, the aromatic ring may optionally include one or more ring substituents, such as a fluoro, chloro, alkyl (e.g., methyl or ethyl), methoxy, or trifluoromethyl group. If desired, the one or more polycarboxylic acids may further include one or more heteroatoms (e.g., one or more oxygen, sulfur or nitrogen atoms) incorporated in the molecular structure, such as for example an ether group in the case of oxygen atom incorporation or a thioether group in the case of sulfur atom incorporation.

Examples of suitable polycarboxylic acids include adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, TOFA dimer, hydrogenated TOFA dimer, 2-(2-carboxyphenyl) benzoic acid, 2,5-furandicarboxylic acid, camphoric acid, cis-norbornene-endo-2,3-dicarboxylic acid, trimellitic acid, and combinations thereof.

Component—Catalysts: In some embodiments, the reaction mixture comprises a co-catalyst, an esterification catalyst and/or a disproportionation catalyst. In another aspect, a reaction mixture comprises a rosin, an esterification catalyst and/or a disproportionation catalyst and a co-catalyst. In yet another aspect, a reaction mixture comprises (a) a rosin a disproportionation catalyst, and (c) a co-catalyst.

Suitable esterification catalysts include Lewis acids and Brønsted-Lowry acids. Examples include acidic catalysts such as acetic acid, p-toluenesulfonic acid, methanesulfonic acid, hypophosphorous acid, and sulfuric acid; alkaline metal hydroxides such as calcium hydroxide; metal oxides, such as calcium oxide, magnesium oxide, and aluminum oxide; and other metal salts, such as iron chloride, calcium formate, and calcium phosphonates (e.g., calcium bis-monoethyl (3,5-di-tert-butyl-4-hydroxybenzyl) phosphonate, Irganox® 1425).

Co-catalyst: The reaction mixture comprises a co-catalyst. Although the term co-catalyst is used, it should be noted that the co-catalyst can be used by itself without the addition of an esterification catalyst or a disproportionation catalyst. Examples of compounds for use as co-catalysts in are represented by Formula I:

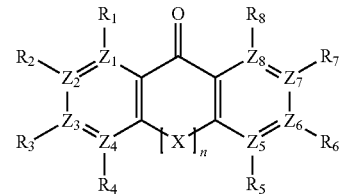

wherein n=0 or n=1 or n=2; X represents oxygen, sulphur, nitrogen, or carbon; $Z_1$, $Z_2$, $Z_3$, $Z_4$, $Z_5$, $Z_6$, $Z_7$ and $Z_8$ are the same or different and each represents carbon or nitrogen; $R_1$, $R_2$, $R_3$, $R_4$, $R_5$, $R_6$, $R_7$ and $R_8$ are the same or different and each independently can be hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a carboxyalkyl group, a glucopyranosyl group or a glucopyranosyloxy group.

X represents an oxygen, sulphur, nitrogen, or carbon atom, which atoms are substituted according to the chemistry valence rules with one or more substituents and which additional substituents are selected from hydrogen, oxygen, hydroxyl, alkyl, alkenyl, alkynyl, cycloalkyl, cycloalkylalkyl, aryl, heteroaryl, aralkyl, oxiranylalkyl, carboxyalkyl, carboxyalkyl, hydroxyalkyl, halogen substituted benzyl, alkyl substituted benzyl, alkoxy substituted benzyl, halogen substituted aryl, alkyl substituted aryl, and alkoxy substituted aryl, or atom X is covalently connected to atom $Z_5$ in formula (I) to lead to a five-membered or six-membered ring in the case that X represents a nitrogen atom or carbon atom. Examples of such compounds of general structure (I) are 10-alkyl-9(10H)-Acridinone and 9H-Thioxanthen-9-one, 10,10-dioxide. In one aspect, when n=2, the structure of Formula I has two X groups which may be the same or different. In such instances, both X groups may be a carbon, or one X group may be a carbon and the second X group may be a nitrogen, oxygen or sulphur.

In one embodiment, two of the substituents $R_1$, $R_2$, $R_3$, $R_4$, $R_5$, $R_6$, $R_7$ and $R_8$ adjacent to each other may form together with the carbon atom to which they are bonded a ring. $R_4$ and $R_5$ are considered as adjacent positions in the case that n=0. The ring could be cycloaliphatic, aromatic or heteroaromatic and optionally contain one or more substituents wherein the substituents are the same or different and are selected from hydrogen, methyl, ethyl, hydroxy, methoxy, cyano, amino, chloro and fluoro. The ring is optionally substituted with an additional fused or isolated cycloaliphatic, aromatic or heteroaromatic ring. An example wherein two of the substituents $R_1$, $R_2$, $R_3$, $R_4$, $R_5$, $R_6$, $R_7$ and $R_8$ adjacent to each other form together with the carbon atom to which they are bonded a ring is 4H-Cyclopenta[lmn]phenanthridine-5,9-dione. Other examples are 4H-Cyclopenta[def]phenanthren-4-one and 7H-Benzo[c]fluoren-7-one.

Several compounds of Formula (I) are occurring in nature. For example, a number of xanthones have been isolated from natural sources of higher plants, fungi, ferns, and lichens. These naturally occurring compounds can have various substitution patterns $R_1$, $R_2$, $R_3$, $R_4$, $R_5$, $R_6$, $R_7$ and $R_8$ and can occur as optically active stereoisomers. These naturally occurring compounds of general structure (1) can be commercially available. Naturally occurring compounds of general structure (1) are part of the present invention. Examples of such naturally occurring compounds of general structure (1) are 4-β-D-glucopyranosyl-1,3,6,7-tetrahydroxy-9H-Xanthen-9-one (CAS No. 24699-16-9, isomangiferin), 3a,12c-dihydro-8-hydroxy-6-methoxy-(3aR,12cS)-7H-Furo[3',2':4,5]furo[2,3-c]xanthen-7-one (CAS No. 10048-13-2, Sterigmatocystin) and 1,3,6-trihydroxy-7-methoxy-2,8-bis(3-methyl-2-buten-1-yl)-9H-Xanthen-9-one (CAS No. 6147-11-1, mangostin).

Alternatively, the co-catalyst may comprise a precursor of any of the compounds characterized by Formula I and its associated functional groups as described herein. Alternatively, the co-catalyst can comprise the product of a chemical reduction or the product of a chemical oxidation of any of the compounds characterized by Formula I and its associated functional groups as described herein. Alternatively, the co-catalyst can comprise the product of a chemical reduction or the product of a chemical oxidation of a precursor of any of the compounds characterized by Formula I and its associated functional groups as described herein.

In yet another aspect, examples of co-catalysts include thioxanthones, anthrones, xanthones, acridones, fluorenones, and any dimer, oligomer or polymeric derivative thereof, any complex thereof, any precursor thereof, any salt thereof, any stereoisomer thereof, any tautomer thereof or any combination thereof. Examples of co-catalyst compounds includes anthrone, xanthone, 1-azaxanthone, acridone, 10-methyl-9(10H)-acridone, 9-fluorenone, thioxanthone, 2-isopropylthioxanthone, 4-isopropylthioxanthone, 2-chlorothioxanthone, 1-chloro-4-propoxythioxanthone, 2,4-diethylthioxanthone, 2,4-dimethylthioxanthone and 2,4-diisopropylthioxanthone.

In one embodiment, the co-catalyst comprises anthrone, xanthone, thioxanthone, acridone or 9-fluorenone, the structures of which are depicted below. The co-catalyst may also comprise derivatives of anthrone, xanthone, thioxanthone, acridone or 9-fluorenone according to Formula I.

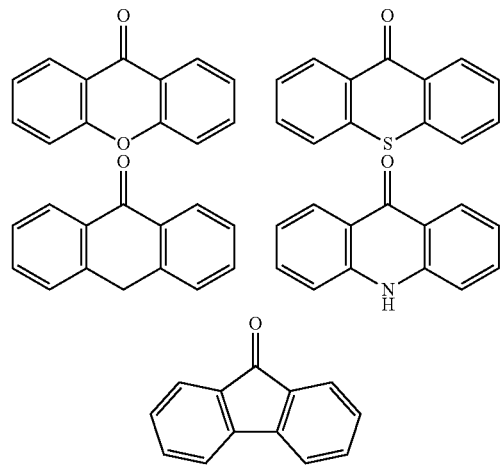

In some aspects, the esterification catalyst is present in an amount ranging from 0.01 wt. % to 5.0 wt. %, alternatively from 0.01 wt. % to 1.0 wt. %, or alternatively from 0.02 wt. % to 0.5 wt. % based on the weight of the one or more rosins.

In one embodiment, the co-catalyst is present in an amount ranging from 0.01 wt. % to 5.0 wt. %, alternatively from 0.01 wt. % to 1.0 wt. %, or alternatively from 0.02 wt. % to 0.5 wt. % based on the weight of one or more rosins. Co-catalysts of the type disclosed herein may be prepared by any suitable methodology. For example, co-catalysts suitable for use in the present disclosure are described in L. Murov, I. Carmichael and G. L. Hug, Handbook of Photochemistry, Marcel Dekker, Inc, New York 1993, U.S. Pat. Nos. 4,585,876; 4,661,595; 5,545,760; European Patent No. 0520574; and U.S. Patent Application No. 2014/0107354, each of which is incorporated by reference herein.

In one embodiment, the co-catalyst is any material able to catalyze the reactions disclosed herein and compatible with the other components of the mixture. In an aspect, the co-catalyst suitable has a high triplet formation quantum yield (designated $\phi_T$). The energy of the co-catalyst singlet ($E_S$) and the triplet ($E_T$) state is indicated in kJ/mol. The energy difference $E_S$-$E_T$ is expressed as $E_A$ (kJ/mol). The co-catalyst has a triplet formation quantum yield ($\phi_T$) expressed as formation factor and a triplet lifetime ($\tau_T$) expressed in microseconds (µs). In an aspect, the co-catalyst has a $\phi_T$ of greater than 0.5, alternatively greater than 0.7 or alternatively greater than 0.8. In an aspect, the co-catalyst has a triplet lifetime of greater than 0.5 µs, alternatively greater than 1.0 µs or alternatively greater than 5.0 µs. In an aspect, the co-catalyst has an $E_S$ of greater than 200 kJ/mol; alternatively greater than 225 kJ/mol or alternatively greater than 250 kJ/mol. In an aspect, a suitable co-catalyst has a $E_A$ of less than 100 kJ/mol, alternatively less than 75 kJ/mol or less than 50 kJ/mol. Values for co-catalysts of the type disclosed herein is presented in Table 1:

TABLE 1

| Compound | $E_S$ (KJ/mol)* | $E_T$ (KJ/mol)* | $E_A$ (KJ/mol) | $\phi_T$ | $\tau_T$ (µS) |
|---|---|---|---|---|---|
| Acridone | 304 | 244 | 60 | 0.99 | 20 |
| Xanthone | 324 | 310 | 14 | | 20 |
| Anthraquinone | 284 | 261 | 23 | 0.9 | 0.11 |

*Values based on non-polar solvent

Method for Preparation: In an aspect, a reaction mixture to prepare the light color rosin ester comprises (a) one or more rosins, (b) one or more monocarboxylic acids, (c) one or more polyhydric alcohols and (d) one or more polycarboxylic acids. The ratio of the weight of one or more polycarboxylic acids to the weight of the rosin and the one or more monocarboxylic acids can be less than 1:20, alternatively less than 1:50, or alternatively less than 1:100. In some cases, the ratio of the weight of the rosin to the weight of the one or more monocarboxylic acids can range from 60:40 to 10:85. The ratio of the weight of the rosin and the one or more monocarboxylic acids to the weight of one or more polycarboxylic acids can be at least 6.5:1, or at least 15:1. The values provided are for the amount (e.g., wt. %) of a component or reactant used in the preparation of compositions. The final material after all processing steps may not have the individual components (e.g., rosin) discernable chemically or physically from the other components utilized in the preparation of the final composition.

The rosin ester can be prepared by esterification, transesterification or interesterification reactions utilizing the reactants, catalysts and co-catalysts disclosed herein. Suitable reaction conditions are described for example, U.S. Pat. No. 5,504,152, which is hereby incorporated by reference. Suitable reaction conditions may be selected in view of factors comprising: a) the nature of the reactants (e.g., the chemical and physical properties of the rosin); b) the identity of the one or more monocarboxylic acids; c) the identity of the one or more polycarboxylic acids; d) the identity of the one or more polyhydric alcohols; e) the identity of the one or more catalysts monocarboxylic acids and e) the desired chemical and physical properties of the resultant rosin ester and combinations thereof.

In one embodiment, the method comprises esterifying a reaction mixture comprising one or more rosins, one or more monocarboxylic acids, and optionally one or more polycarboxylic acids with one or more polyhydric alcohols using an esterification catalyst in the presence of a co-catalyst. The method can optionally include a disproportionation agent. The method can be a thermal reaction at an elevated temperature. In one embodiment, the rosin ester is prepared by subjecting the mixture to a temperature from 200° C. to 320° C., alternatively from 240° C. to 300° C. or alternatively from 265° C. to 290° C. The esterifying step can further comprise removing water formed as a byproduct to drive the reactions to completion, using standard methods, such as distillation and/or application of a vacuum.

In some aspects, the rosin ester can be prepared by an esterification process, wherein the carboxylic acid-containing components are esterified with one or more polyhydric alcohols. An esterification reaction of this type is an equilibrium reaction. The removal of the water formed as the reaction proceeds may shift the reaction equilibrium to favor product formation and thereby drive the reaction towards completion. Accordingly, in some aspects, the method comprise esterifying a mixture comprising one or more rosins, one or more monocarboxylic acids, and optionally one or more polycarboxylic acids with one or more polyhydric alcohols. The esterification step may comprise allowing the reaction mixture and the one or more polyhydric alcohols to react for a period of time and under suitable conditions (e.g., elevated temperature). Optionally, the esterifying step may further comprise removing water formed as a byproduct of the esterification reaction. In some aspects, the esterifying step may comprise contacting the reaction mixture and the one or more polyhydric alcohols with an esterification catalyst (e.g., calcium-bis(((3,5-bis(1,1-dimethylethyl)-4-hydroxyphenyl)methyl)-ethylphosphonate)) in the presence of a co-catalyst as described herein.

The rosin ester can also be prepared by a transesterification process, wherein esters of the carboxylic acid-containing components are reacted with one or more polyhydric alcohols. In the case of polyhydric alcohols that have reacted with carboxylic acids, some free unreacted polyhydric alcohol hydroxyl groups may remain which may react in a transesterification reaction with esters and result in an exchange of their alkoxy groups. Such a transesterification reaction is an equilibrium reaction wherein new rosin ester may be formed. Accordingly, in some aspects, the method may comprise reacting one or more rosin esters having a hydroxyl value greater than zero with one or more esters derived from monocarboxylic acids and optionally one or more polycarboxylic acids. In some aspects, an alcohol or a polyhydric alcohol may be added to trigger or accelerate such a transesterification reaction. In some aspects, the transesterifying step may comprise contacting the mixture and the one or more polyhydric alcohols with an esterification catalyst in the presence of a co-catalyst.

The rosin ester can also be prepared by an inter-esterification process, which is mechanistically related to esterification and transesterification. Inter-esterification may be carried out by blending different esters and then rearranging the carboxylic acid moieties over the applied polyhydric alcohol backbones in the presence of a catalyst, for example an esterification catalyst, in the presence of a co-catalyst. Inter-esterifications are equilibrium reactions. By way of an example, a rosin ester may be reacted with a triglyceride ester, such as rapeseed oil. Such an inter-esterification reaction would afford a rosin ester wherein the fatty acid moieties in the triglyceride ester are partly substituted by rosin acid moieties, and wherein the rosin acid moieties in the rosin ester are partly substituted by fatty acid moieties.

Optionally, the method may include varying the relative amount of reactants in order to influence the hydroxyl number and acid number of the resultant rosin ester. For example, a stoichiometric excess of carboxylic acid functionality versus polyhydric alcohol functionality will in general lead rosin esters having a low or negligible hydroxyl number. From a chemistry perspective, it means that more moles of carboxylic acid moieties (carboxyl moieties), as compared to the number of moles of total polyhydric alcohol hydroxyl moieties, may be applied. In some aspects, the reactant mixture prior to the start of the synthesis may contain a stoichiometric molar ratio of total hydroxyl functionality to total carboxyl functionality of 1.40 or less (e.g., 1.10 or less, 1.05 or less, 1.00 or less, or 0.95 or less, or from 1.00 to 1.15).

In one embodiment, the method comprises contacting a rosin and a co-catalyst, to form a reaction mixture and heating the reaction mixture to a temperature in the range of from 285° C. to 320° C. to produce a light color rosin. The light color rosin referred to has a lighter color than the rosin heated without co-catalyst. In another embodiment, the method comprises contacting a rosin, a co-catalyst and a disproportionation catalyst to form a reaction mixture and heating the reaction mixture to a temperature of from 260° C. to 295° C. In yet another embodiment, the rosin is brought into contact with additional catalysts and reagents (e.g., an esterification catalyst, a disproportionation catalyst, a polyol, etc.) and heated from 260° C. to 295° C. in order to produce light colored rosin ester compositions.

In embodiments, the method can further include one or more additional processing steps. In some aspects, the one or more rosins, and combinations thereof may be further processed, for example, to decrease the PAN number of the rosin; to influence the weight ratio of various rosin acids and/or rosin acid esters present; to influence the hydroxyl number; to influence the acid number; and combinations thereof. Where chemically permissible, such methods may also be performed in combination with the esterification reaction, following the esterification reaction but prior to the hydrogenation reaction, following the hydrogenation reaction, and combinations thereof to obtain a rosin ester and/or a hydrogenated rosin ester having the desired chemical and physical properties, as discussed in more detail below.

In certain aspects, the rosin is disproportionated prior to esterification. In these aspects, a disproportionated rosin or partly disproportionated rosin may be used as a feedstock for esterification. In some cases, disproportionation or further disproportionation may be conducted during esterification. For example, disproportionated or partly disproportionated rosin may be generated in situ and esterified thereafter in a one-pot procedure to a rosin ester.

In some aspects, methods may further comprise hydrogenating the rosin ester, e.g., contacting the rosin ester with a hydrogenation catalyst for a period of time and under suitable conditions to form a hydrogenated rosin ester. Examples of hydrogenation catalyst include heterogeneous hydrogenation catalysts (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). In some cases, the hydrogenation catalyst may be present in an amount ranging from 0.25 wt. % to 5 wt. %, based on the total weight of the crude rosin ester. The hydrogen source for the hydrogenation may by hydrogen ($H_2$) or a compound which may generate hydrogen under reaction conditions, such as formic acid, isopropanol, cyclohexene, cyclohexadiene, a diimide, or hydrazine.

The hydrogenation reaction can be at an elevated temperature, an elevated pressure, and combinations thereof, e.g., from 120° C. to 300° C. temperature, a pressure ranging from 30 to 2000 pounds per square inch (psi), or alternatively from 100 to 1000 psi.

In some aspects, following esterification, transesterification or interesterification, the resultant rosin ester can comprise low amounts of residual materials, such as unreacted rosin, decarboxylated rosin acid, and/or unreacted or partly reacted polyhydric alcohol. After removal of volatiles, a rosin ester which is characterized by a low acid number may be characterized by a relatively low weight fraction of lower molecular weight species and may be suitable for applications where low migration and/or low volatile organic compound content is beneficial. Examples may comprise food contact applications, adhesives and low-fogging systems.

Optionally, methods may include one or more process steps to influence the hydroxyl number of the resultant rosin ester, to influence the acid number of the resultant rosin ester, and combinations thereof. If desired, the rosin ester can be chemically modified following esterification (e.g., following the esterification reaction but prior to any hydrogenation reaction, or following the hydrogenation reaction) to provide a rosin ester having a low hydroxyl number. This process involves chemical modification of residual hydroxyl moieties in the rosin ester or hydrogenated rosin ester following esterification using suitable synthetic methods. For example, reaction with an acylating agent (e.g., a carboxylic acid or a derivative thereof, such as an acid anhydride disclosed in U.S. Pat. No. 4,380,513, incorporated by reference). Residual hydroxyl moieties in the rosin ester or hydrogenated rosin ester may also be reacted with an electrophilic reagent, such as an isocyanate, to produce the corresponding carbamate derivative. Other suitable electrophilic reagents which may be used to react residual hydroxyl moieties include alkylating agents. In some aspects, the acid number of the rosin ester may be reduced by removing excess and/or unreacted rosin (e.g., rosin acids) following the esterification, but prior to any subsequent processing (e.g., hydrogenation reaction, or following the hydrogenation reaction). For example, following esterification, unreacted rosin and other volatile components, may be removed using any suitable methodology.

The rosin ester may also be prepared by a combination of the esterification, transesterification, and interesterification methods described above, wherein esters may be reacted which each other in the presence of one or more polyhydric alcohols and one or more monocarboxylic acids and optionally one or more polycarboxylic acids or their partial esters or half esters. An example of partial esters are partial glycerides, which are esters of glycerol with fatty acids where not all the hydroxyl groups are esterified. cis-HOOC—CH=CH—$COOCH_3$ is an example of a half ester derived from maleic acid. Adipic acid monomethyl ester and adipic acid monoethyl ester are examples of half esters derived from adipic acid. The removal of the water or volatile monoalcohols formed as the reaction proceeds may shift the reaction equilibrium to favor product formation and thereby drive the reaction towards completion.

Reactants based on monocarboxylic acids having a modified carboxyl group or polycarboxylic acids having one or more modified carboxyl groups may be used in place of the monocarboxylic acids or polycarboxylic acids, respectively. For example, partial esters and half esters, as described above, may be used in place of polycarboxylic acids. Other examples include anhydrides, thioesters and carbonyl chlorides, also called acyl chlorides or acid chlorides, which may be substituted for monocarboxylic acids or polycarboxylic acids. In general, these structurally related reactants contain an acyl group that may react with a nucleophile (e.g., the hydroxyl group of a polyhydric alcohol) via a nucleophilic acyl substitution mechanism.

In any of the methods, anhydrides may be used as alternative reactants instead of the corresponding carboxylic acids or polycarboxylic acids. For example, succinic anhydride, also called dihydro-2,5-furandione, may be applied instead of succinic acid and palmitic anhydride may be applied instead of palmitic acid. Trimellitic anhydride may be applied instead of trimellitic acid. Analogously, an acid chloride, may be applied instead of the corresponding carboxylic acid or may be applied instead of an ester derived from the corresponding carboxylic acid. For example, methyl adipoyl chloride, also called adipic acid monomethyl ester chloride, may be applied as a reactant instead of adipic acid or adipic acid dimethyl ester, adipic acid diethyl ester, adipic acid monomethyl ester, adipic acid monoethyl ester or adipoyl chloride.

Properties: The rosin ester is characterized as having an improved Gardner color. (as determined according to ASTM D1544-04 (2010)) of less than 10, alternatively of less than 8, or alternatively of less than 6. In further aspects, the rosin ester displays a final (neat) Gardner color of less than 6, alternatively of less than 3, or alternatively of less than 1.5.

In some aspects, the rosin ester exhibits color stability upon thermal aging, a change of 5.0 or less Gardner color units when heated to a temperature of 177° C. for a period of 96 hours (e.g., 3.0 or less, or 1.0 or less). In some embodiments, the rosin ester exhibit a change of 0 to 5.0, 0.1 to 5.0, 0.2 to 5, 0.3 to 5.0, 0.5 to 5.0, 1.0 to 5.0, 2.5 to 5.0, 3.0 to 5.0, 3.5 to 5.0, 4.0 to 5.0 or 4.5 to 5.0 Gardner color units.

In some aspects, the rosin ester has a softening point of between 0° C. and 150° C., alternatively between 50° C. and 130° C., or alternatively between 70° C. and 120° C. as measured using the Ring and Ball method. In certain aspects, the rosin ester may be a liquid (e.g., a viscous liquid) at 20° C. and 1 atm.

In some aspects, the rosin ester has a glass transition temperature (Tg) of between −80° C. and 100° C., alternatively between −30° C. and 80° C., or alternatively between 0° C. and 70° C. as determined by means of Differential scanning calorimetry (DSC).

In one embodiment, the rosin ester is characterized as having residual amounts of the co-catalyst in amounts of 0 ppm to 200 ppm, alternatively from 5 ppm to 150 ppm, alternatively from 0.0005 wt. % to 0.015 wt. %. Initially in some embodiments, 800-4000 ppm of the co-catalyst is added to form the rosin ester.

Applications: The rosin ester compositions provided herein may be used in a variety of applications, including adhesives (e.g., hot-melt adhesives), tackifiers in hot-melt and pressure-sensitive adhesives, adhesive dispersions such as adhesive aqueous dispersions, modifiers for rubbers and various plastics, emulsifiers for synthetic rubbers, base materials for chewing gum, resins in coating compositions, inks, sizing agents for paper making, asphalt markings, pavement markings, road surface markings, thermoplastic road surface markings, inks, coatings, rubbers (e.g., tires and tire treads), sealants and plasticizers. The rosin ester can also be used in a variety of additional applications, including as a softener and plasticizer in chewing gum bases, as a weighting and clouding agent in beverages, as a surfactant, surface activity modulator, or dispersing agent, as an additive in waxes and wax-based polishes, as a modifier in skin products and cosmetic formulations (e.g., mascara), in the electrical industry as insulators, as drying oils in making paints and other wood treatment products, in treating the hulls of wooden boats, in soaps, in candles, as a lubricant in automotive applications and engine lubricants, to make biodiesel, to produce biodegradable hydraulic fluids, in metal working and other industrial applications, as a phase change material, or a curing agent in concrete.

Other examples include road surface markings such as reflective markers, thermoplastic road surface markings, preformed thermoplastic pavement markings and preformed polymer tape. Thermoplastic binder systems are generally based on rosin esters of the type disclosed herein and also include plasticizers, glass beads (or other optics), pigments, and fillers. There is continuous effort to improve the road marking system, and technological breakthroughs include adding retro-reflectivity, increasing longevity, and lowering installation cost. The light color rosin ester possess brighter, more vivid shades of color that can provide significant improvements to road surface marking applications. In one embodiment, the rosin ester is used in a thermoplastic road surface marking formulation. The formulation may include from 5 wt. % to 25 wt. %, or alternatively from 10 wt. % to 20 wt. % of the rosin ester, based on the total weight of the thermoplastic road surface marking formulation. The thermoplastic road surface marking formulation may further include a polymer (e.g., a polymer derived from one or more ethylenically-unsaturated monomers), e.g., from 0.1 wt. % to 1.5 wt. % of the thermoplastic road surface marking formulation. The formulation may further include a pigment (e.g., from 1 wt. % to 10 wt. % titanium dioxide), and glass beads (e.g., from 30 wt. % to 40 wt. %), and a filler (e.g., calcium carbonate which may make up the balance of the composition up to 100 wt. %). The formulation may further include an oil (e.g., from 1 wt. % to 5% wt. % mineral oil), a wax (e.g., from 1 wt. % to 5 wt. % percent paraffin-based wax or synthetic Fischer-Tropsch wax), a stabilizer (e.g., from 0.1 wt. % to 0.5 wt. % stearic acid), and, optionally, additional polymers and/or binders other than the rosin ester described herein.

In some embodiments, the rosin ester is used in a hot-melt adhesive. The polymer in the adhesives may be any suitable polymer. The polymer may be, for example, a polyacrylate, a polyolefin, a polyamide, a polyvinyl ether, a polyurethane, a polyester, a polyvinyl ester, a copolymer thereof, or a blend thereof. In some cases, the polymer can be derived from one or more ethylenically-unsaturated monomers. In some aspects, the polymer can comprise any of: a copolymer of ethylene and n-butyl acrylate; a copolymer of styrene and one or more of isoprene and butadiene; a block copolymer of styrene and one or more of isoprene and butadiene; a hydrogenated block copolymer of styrene and one or more of isoprene and butadiene wherein one or more of isoprene and butadiene are hydrogenated or partly hydrogenated; a polymer derived from one or more ethylenically-unsaturated monomers; a polymer derived from vinyl acetate. The hot-melt adhesive may include one or more additional components, including additional tackifiers, waxes, stabilizers (e.g., antioxidants), templating agents, pigments and dyestuffs, plasticizers, and fillers. Hot-melt adhesive compositions in general contain one or more waxes such as a Fischer-Tropsch wax or a paraffin wax.

In an aspect, an adhesive composition may include the rosin ester in an amount of from 15 wt. % to 60 wt. %, alternatively from 25 wt. % to 45 wt. % based on the total adhesive composition. A hot-melt adhesive composition may include 15 wt. % to 60 wt. %, alternatively of from 25 wt. % to 45 wt. % of the rosin ester based on the total amount of the hot-melt adhesive composition. A pressure-sensitive adhesive may include the rosin ester in amounts of 5-60 wt. %, from 25-45 wt. % based on the total pressure-sensitive adhesive composition.

EXAMPLES

The examples are given by way of illustration and are not intended to limit the specification or the claims to follow in any manner.

Hydroxyl numbers were determined according to DIN 53240-2. Acid numbers were determined according to ASTM D465-05 (2010). Softening points were determined according to ASTM E28-99 (2009). PAN numbers and dehydroabietic acid content were determined according to ASTM D5974-00 (2010). The Gardner color was measured according to ASTM D1544-04 (2010). Molecular weight distributions and the derived $M_n$, $M_w$, and $M_z$ values of the oligoesters were determined by GPC. Glass transition temperature (Tg) were determined by DSC. Properties of all used starting rosins are tabulated in table 1:

TABLE 1

| Example | Rosin | Acid number (mg KOH/g) | Softening point (° C.) | Gardner color (neat) |
|---|---|---|---|---|
| 1-13 | SYLVAROS ™ 90 | 172.2 | 64.8 | 7.3 |
| 14 | SYLVAROS ™ 95 | 180.5 | 75.8 | 3.9 |
| 15-16 | Massoniana gum rosin | 170.9 | 77.1 | 6.8 |

TABLE 1-continued

| Example | Rosin | Acid number (mg KOH/g) | Softening point (° C.) | Gardner color (neat) |
|---|---|---|---|---|
| 17-18 | SYLVAROS ™ HYR | 180.6 | 77.0 | 6.2 |
| 19-20 | SYLVAROS ™ S 90/10 | 181.4 | 75.0 | 6.8 |
| 21-24 | SYLVAROS ™ 90 | 175.0 | 65.8 | 7.0 |
| 25-28 | SYLVAROS ™ 90 | 176.1 | 65.2 | 7.1 |

Example 1

SYLVAROS™ 90 (300 g, having an acid value of 172.2 mg KOH/g rosin) was charged into a four-necked flask (0.5 L) and heated to 200° C. under a nitrogen atmosphere. After the rosin was completely melted, the resulting solution was mechanically stirred. Pentaerythritol (27.584 g), Irganox™ 1425 (0.6 g) and Rosinox™ (poly-tert-butylphenoldisulfide; Arkema Inc.) (0.6 g) were added. The reaction mixture was heated to 275° C. (30° C./h) and subsequently held at 275° C. for 8 hours while allowing the formed water to escape as vapor. Residual volatiles were stripped off during two hours of nitrogen sparging and the reaction mixture was cooled to 180° C. Irganox™ 565 (0.24 g was added) and the reaction mixture was discharged after a homogeneous blend was obtained. The obtained rosin ester exhibited a color of 3.3 Gardner (neat).

Examples 2-12

The procedure of Example 1 was repeated, except that an additional co-catalyst (0.6 g) was added (before esterification at 200° C.). In examples 2-9, the co-catalyst was added before the start of the reaction (at 200° C.). In examples 10-12, the co-catalyst was added in increments. Incremental co-catalyst addition was performed as follows: 0.3 g of co-catalyst was added before the start of the reaction (at 200° C.); 0.15 g of co-catalyst was added when the temperature reached 275° C.; 0.075 g of co-catalyst was added after 2 hours of incubation at 275° C.; and 0.075 g of co-catalyst was added after 4 hours of incubation at 275° C. A color improvement of more than 0.6 Gardner (neat) was accomplished by the addition of the co-catalyst. No significant impact on softening point was observed in any of Examples. Results are in Table 2.

TABLE 2

| Example | Co-Catalyst | Catalyst CAS Nr. | Acid number (mg KOH/g) | Softening point (° C.) | Gardner color (neat) |
|---|---|---|---|---|---|
| 1* | —(Reference) | — | 7.0 | 96.6 | 3.3 |
| 2* | Anthraquinone | 84-65-1 | 10.5 | 95.3 | 2.7 |
| 3 | Anthrone | 90-44-8 | 3.6 | 98.0 | 2.5 |
| 4 | Thioxanthen-9-one | 492-22-8 | 5.6 | 96.6 | 2.4 |
| 5 | 2-Isopropylthioxanthone | 5495-84-1 | 5.4 | 97.2 | 2.4 |
| 6 | 2-Chlorothioxanthone | 86-39-5 | 5.2 | 97.9 | 2.4 |
| 7 | 9-Fluorenone | 486-25-9 | 7.1 | 96.1 | 2.3 |
| 8 | Acridone | 578-95-0 | 4.3 | 96.8 | 1.8 |
| 9 | Xanthone | 90-47-1 | 8.9 | 95.8 | 2.0 |
| 10 | Thioxanthen-9-one | 492-22-8 | 10.4 | 94.0 | 1.8 |
| 11 | Xanthone | 90-47-1 | 9.2 | 94.9 | 1.4 |
| 12 | 1-Azaxanthone | 6537-46-8 | 9.7 | 93.8 | 1.5 |

Examples 13-20

The examples were prepared as indicated in Example 1 using rosin (300 g), Irganox™ 1425 (0.6 g), Rosinox™ (poly-tert-butylphenoldisulfide; Arkema Inc.) (0.6 g) and the reagents in the amounts indicated in Table 3. Incremental addition of the co-catalyst in examples 16, 18 and 20 was applied as described above for examples 10-12. Properties of the rosin esters prepared in Examples 13-20 are demonstrated in Table 4.

TABLE 3

| Example | Rosin | Pentaerythritol (g) | Xanthone (g) | ITX (g) |
|---|---|---|---|---|
| 13 | SYLVAROS ™ 90 | 27.6 | 0.3 | |
| 14 | SYLVAROS ™ 95 | 28.9 | 0.6 | |
| 15 | Massoniana gum rosin | 27.4 | — | — |

TABLE 3-continued

| Example | Rosin | Pentaerythritol (g) | Xanthone (g) | ITX (g) |
|---|---|---|---|---|
| 16 | Massoniana gum rosin | 27.4 | 0.6* | |
| 17 | SYLVAROS ™ HYR | 36.2 | — | |
| 18 | SYLVAROS ™ HYR | 36.2 | | 0.6* |
| 19 | SYLVAROS ™ S 90/10 | 29.7 | — | |
| 20 | SYLVAROS ™ S 90/10 | 29.7 | 0.6* | |

TABLE 4

| Example | Acid number (mg KOH/g) | Softening point (° C.) | Hydroxyl number (mg KOH/g) | Gardner color (neat) |
|---|---|---|---|---|
| 13 | 5.3 | 97.4 | 2.8 | 2.1 |
| 14 | 7.6 | 108.3 | 2.6 | 0.2 |
| 15 | 4.5 | 116.7 | 2.8 | 3.8 |
| 16 | 5.9 | 116.1 | 2.3 | 2.2 |
| 17 | 2.1 | 108.1 | 14.2 | 3.8 |
| 18 | 3.9 | 107.5 | 10.5 | 2.4 |
| 19 | 3.1 | 112.3 | 1.2 | 3.3 |
| 20 | 4.8 | 112.2 | 0.2 | 1.2 |

Example 21

SYLVAROS™ 90 (200 g, having an acid value of 175.0 mg KOH/g rosin, and a softening point of 65.8° C.) was charged into a four-necked flask (0.5 L) and heated to 200° C. under a nitrogen atmosphere. After the rosin was completely melted, the resulting solution was mechanically stirred. Rosinox™ (poly-tert-butylphenoldisulfide; Arkema Inc.) (0.6 g) was added and the reaction mixture was heated to 275° C. After 3 hours at 275° C. the reaction mixture was cooled to 180° C. and discharged. Rosin 21 exhibited a color of 2.9 Gardner (neat).

Example 22

The procedure of example 21 was applied however Xanthone (0.6 g) was added at 200° C. before heat-up. Rosin 22 exhibited a color of 1.9 Gardner (neat).

Example 23

SYLVAROS™ 90 (200 g, having an acid value of 175.0 mg KOH/g rosin and a softening point of 65.8° C.) was charged into a four-necked flask (0.5 L) and heated to 200° C. under a nitrogen atmosphere. After the rosin was completely melted, the resulting solution was mechanically stirred. The reaction mixture was heated to 295° C. After 3 hours at 295° C. the reaction mixture was cooled to 180° C. and discharged. Rosin 23 exhibited a color of 5.1 Gardner (neat).

Example 24

The procedure of example 23 was applied, however Xanthone (0.6 g) was added at 200° C. before heat-up. Rosin 24 exhibited a color of 4.6 Gardner (neat).

Example 25

SYLVAROS™ 90 (1200 g, having an acid value of 176.1 mg KOH/g rosin, and a softening point of 65.2° C.) was charged into a four-necked flask (2 L) and heated to 200° C. under a nitrogen atmosphere. After the rosin was completely melted, the resulting solution was mechanically stirred. Pentaerythritol (141.0 g), Irganox™ 1425 (2.4 g), Rosinox™ (poly-tert-butylphenoldisulfide; Arkema Inc.) (2.4 g) and 2-Isopropylthioxanthone (1.2 g) were added. The reaction mixture was heated to 275° C. (30° C./h) while allowing the formed water to escape as vapor. At top temperature, a second portion of 2-Isopropylthioxanthone (0.6 g) was added. After 2 and after 4 hours at 275° C., a third and a fourth portion of 2-Isopropylthioxanthone (0.3 g) were added. After a total hold time of 9 hours at 275° C., residual volatiles were stripped off during 2.25 hours of nitrogen sparging and the reaction mixture was cooled to 200° C. Irganox™ 565 (0.6 g) and Irganox™ 1010 (1.8 g) were added and the reaction mixture was discharged after a homogeneous blend was obtained. Rosin ester 25 exhibited an acid number of 5.3 mg KOH/g rosin ester, a softening point of 91.9° C. and a color of 3.6 Gardner (neat).

Example 26

The procedure of example 25 was applied, however instead of 141.0 gram Pentaerythritol 118.0 gram was applied. Rosin ester 26 exhibited an acid number of 5.9 mg KOH/g rosin ester, a softening point of 94.1° C. and a color of 2.3 Gardner (neat).

Example 27

The procedure of example 25 was applied, however instead of 2-Isopropylthioxanthone, 9-Fluorenone was applied. The rosin ester exhibited an acid number of 4.7 mg KOH/g rosin ester, a softening point of 92.8° C. and a color of 2.8 Gardner (neat).

Example 28

The procedure of example 27 was applied, however instead of 141.0 gram pentaerythritol, 118.0 gram was applied. The rosin ester exhibited an acid number of 1.6 mg KOH/g rosin ester, a softening point of 96.1° C. and a color of 1.8 Gardner (neat).

While various aspects of the present disclosures have been shown and described, modifications thereof can be made by one skilled in the art without departing from the spirit and teachings of the disclosure. The aspects of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. The claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

The invention claimed is:

1. A method to provide a light color rosin ester, the method comprising:
contacting one or more rosins with a co-catalyst, a disproportionation catalyst, one or more polyhydric alcohols and, optionally one or more monocarboxylic acids, and optionally one or more polycarboxylic acids, to produce a mixture; and
heating the mixture to produce the light color rosin ester;
wherein the co-catalyst has a triplet formation quantum yield ($\phi_T$) of greater than 0.5 and a triplet lifetime ($\tau_T$) of greater than 0.5 microseconds.

2. The method of claim 1, wherein the one or more rosins has at least 30 wt. % dehydroabietic acid.

3. A rosin ester produced by the method of claim 1, wherein the rosin ester comprises 5 ppm to 150 ppm of the co-catalyst.

4. The rosin ester of claim 3, wherein the rosin ester has a PAN number of equal to or less than 25.

5. The rosin ester of claim 3, wherein the rosin ester exhibits a change of less than 5.0 Gardner color units when heated to a temperature of 177° C. for a period of 96 hours.

6. An adhesive composition comprising the rosin ester of claim 3.

7. A roadmarking composition comprising the rosin ester of claim 3.

8. A pressure sensitive adhesive composition comprising the rosin ester of claim 3.

9. A method for producing a light color rosin comprising:
contacting one or more rosins with a co-catalyst to produce a mixture;
heating the mixture to a temperature to produce a light color rosin;
wherein the co-catalyst comprises compounds represented by formula:

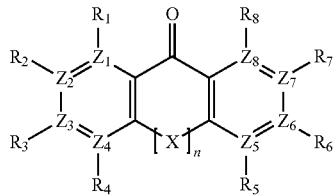

wherein n=0, 1 or 2;
X represents oxygen, sulphur, nitrogen, or carbon;
$Z_1$, $Z_2$, $Z_3$, $Z_4$, $Z_5$, $Z_6$, $Z_7$ and $Z_8$ are the same or different and each represents carbon or nitrogen;
$R_1$, $R_2$, $R_3$, $R_4$, $R_5$, $R_6$, $R_7$ and $R_8$ are the same or different and each is independently selected from the group of hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a glucopyranosyl group, and a glucopyranosyloxy group.

10. The method of claim 9, wherein the co-catalyst has a triplet formation quantum yield ($\phi_T$) of greater than 0.5 and a triplet lifetime ($\tau_T$) of greater than 0.5 microseconds.

11. The method of claim 9, wherein the co-catalyst comprises at least one of acridone, anthrone, 9-fluorenone, thioxanthone, xanthone, derivatives, and combinations thereof.

12. The method of claim 9 for producing a light color rosin, wherein the light color rosin has an initial (neat) Gardner color, as determined according to ASTM D1544-04 (2010), of less than 10.

13. The method of claim 9, further comprising contacting the mixture with a disproportionation catalyst.

14. The method of claim 13, wherein the disproportionation catalyst is selected from the group of 2,2'thiobisphenols, 3,3'-thiobisphenols, 4,4'-thiobis(resorcinol), 1,1'-thiobis(pyrogallol), 4,4'-thiobis(6-t-butyl-m-cresol), 4,4'-thiobis(6-t-butyl-o-cresol) thiobisnaphthols, 2,2'-thio-bisphenols, 3,3'-thio-bis phenols, palladium, nickel, platinum, iodines, iodides, sulfides, poly-t-butylphenoldisulfide, 4,4'thiobis(2-t-butyl-5-methylphenol, nonylphenol disulfide oligomers, amylphenol disulfide polymer, and combinations thereof.

15. The method of claim 13, wherein the disproportionation catalyst is present in an amount of from 0.01 wt. % to 5.0 wt. %, and the co-catalyst is present in an amount of from 0.01 wt. % to 5.0 wt. %, based on the total weight of the rosin or rosin ester.

16. The method of claim 9 for producing a light color rosin, wherein the one or more rosins comprise any of a tall oil rosin, a gum rosin, a wood rosin, a disproportionated rosin, a fortified rosin and combinations thereof.

17. The method of claim 9 for producing a light color rosin, wherein the one or more rosins have an acid number value ranging from about 120 mg KOH/gram to about 190 mg KOH/gram.

18. A method for producing a light color rosin ester, the method comprising:
contacting one or more rosins with a co-catalyst, one or more polyhydric alcohols, optionally one or more of a monocarboxylic acid, and optionally one or more of a polycarboxylic acid to produce a mixture;

heating the mixture to a temperature to produce a light color rosin ester;
wherein the co-catalyst comprises compounds represented by formula:

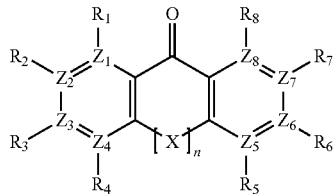

wherein n=0, 1 or 2;
X represents oxygen, sulphur, nitrogen, or carbon;
$Z_1$, $Z_2$, $Z_3$, $Z_4$, $Z_5$, $Z_6$, $Z_7$ and $Z_8$ are the same or different and each represents carbon or nitrogen;
$R_1$, $R_2$, $R_3$, $R_4$, $R_5$, $R_6$, $R_7$ and $R_8$ are the same or different and each is independently selected from the group of hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a glucopyranosyl group and a glucopyranosyloxy group.

19. The method of claim 18, further comprising contacting the mixture with a disproportionation agent.

20. The method of claim 18, wherein the disproportionation catalyst is selected from the group of 2,2'thiobisphenols, 3,3'-thiobisphenols, 4,4'-thiobis(resorcinol), 1,1'-thiobis(pyrogallol), 4,4'-thiobis(6-t-butyl-m-cresol), 4,4'-thiobis(6-t-butyl-o-cresol) thiobisnaphthols, 2,2'-thio-bisphenols, 3,3'-thio-bis phenols; metals, including palladium, nickel, and platinum; iodine or iodides (e.g., iron iodide); sulfides, poly-t-butylphenoldisulfide, 4,4'thiobis(2-t-butyl-5-methylphenol, nonylphenol disulfide oligomers, amylphenol disulfide polymer and combinations thereof.

21. The method of claim 18 for producing a light color rosin ester, wherein the one or more rosins are selected from the group of a tall oil rosin, a gum rosin, a wood rosin, a disproportionated rosin, a fortified rosin, and combinations thereof.

22. The method of claim 18, further comprising fortifying the rosin with any of fumaric acid, maleic acid, acrylic acid, maleic anhydride, citraconic acid, mesaconic acid, itaconic acid, and esters derived therefrom.

23. The method of claim 18, wherein the one or more polyhydric alcohols has an average hydroxyl functionality from 2 to 10.

24. The method of claim 18, wherein the one or more polyhydric alcohols comprise at least one of glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyethylene glycol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, lactitol, and combinations thereof.

25. The method of claim 18, wherein the one or more polyhydric alcohols are present in an amount of from about 5 wt. % to about 40 wt. % based on the total weight of the rosin ester.

26. The method of claim 18, wherein the one or more monocarboxylic acids are present in an amount of from about 15 wt. % to about 90 wt. % based on the total weight of the rosin ester.

27. The method of claim 18, wherein the one or more monocarboxylic acids are selected from the group of formic acid, acetic acid, propionic acid, butyric acid, valeric acid, caproic acid, enanthic acid, caprylic acid, pelargonic acid, capric acid, lauric acid, myristic acid, palmitic acid, stearic acid, arachidic acid, behenic acid, cerotic acid, benzoic acid, cyclopropanecarboxylic acid, cyclopentanecarboxylic acid, cyclohexanecarboxylic acid, linoleic acid, alpha-linolenic acid, elaidic acid, sapienic acid, arachidonic acid, myristoleic acid, palmitoleic acid, oleic acid, myristic acid, isostearic acid, and combinations thereof.

28. The method of claim 18, wherein the one or more polycarboxylic acids comprise from 2 to 54 carbon atoms.

29. The method of claim 18, wherein the one or more polycarboxylic acids are selected from the group of adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, TOFA dimer, hydrogenated TOFA dimer, 2-(2-carboxyphenyl) benzoic acid, 2,5-furandicarboxylic acid, camphoric acid, cis-norbornene-endo-2,3-dicarboxylic acid, trimellitic acid, and combinations thereof.

30. The method of claim 18, further comprising contacting the mixture with an esterification catalyst.

31. The method of claim 30, wherein the esterification catalyst is selected from the group of acetic acid, p-toluenesulfonic acid, methanesulfonic acid, hypophosphorous acid, sulfuric acid, alkaline metal hydroxides, calcium hydroxide, metal oxides, calcium oxide, magnesium oxide, aluminum oxide, calcium bis-monoethyl (3,5-di-tert-butyl-4-hydroxybenzyl) phosphonate and combinations thereof.

* * * * *